United States Patent [19]

Dvorak

[11] Patent Number: 5,761,954
[45] Date of Patent: Jun. 9, 1998

[54] TRIGGER ANALYZER

[76] Inventor: Vojtech Dvorak, 8274 S. Yorktown Ct., Apt. B, Tulsa, Okla. 74137

[21] Appl. No.: 785,383

[22] Filed: Jan. 21, 1997

[51] Int. Cl.$^6$ .................................................. G01L 5/14
[52] U.S. Cl. ........................................................... 73/167
[58] Field of Search ..................... 73/167, 774, 789, 73/791, 817, 818, 826, 831–833, 856, 860

[56] References Cited

U.S. PATENT DOCUMENTS

| | | | |
|---|---|---|---|
| 2,363,547 | 11/1944 | Novak | 73/167 |
| 2,494,571 | 1/1950 | Milburn | 73/167 |
| 2,596,456 | 5/1952 | Williams | 73/167 |
| 3,024,653 | 3/1962 | Broadway | 73/167 |
| 4,012,860 | 3/1977 | Auger | 42/94 |
| 4,108,719 | 8/1978 | Olshausen | 73/789 |
| 4,342,220 | 8/1982 | Catchpole et al. | 73/49.7 |
| 4,342,223 | 8/1982 | Smith . | |
| 4,452,458 | 6/1984 | Timander et al. . | |
| 4,913,655 | 4/1990 | Pinkley et al. | 434/16 |
| 5,406,853 | 4/1995 | Lintilhac et al. | 73/789 |

*Primary Examiner*—Robert Raevis

[57] ABSTRACT

A device for measuring the entire profile of a firearm's trigger performance. This device may be either hand held or permanently mounted. The device may be connected to a sensor for sensing strike of the firing pin and connected to a computer for graphically and numerically displaying data relating to the firearm's performance. The device is capable of calculating key firearm performance parameters, including lock time and roughness of the trigger profile.

13 Claims, 7 Drawing Sheets

TRIGGER ANALYZER

BACKGROUND OF THE INVENTION

1. Field of the Invention

The present invention relates to a hand held or permanently mountable device which can be employed to analyze the trigger characteristics of various types of firearms. Specifically, the device measures and analyzes force on the trigger as a function of travel of the trigger and time elapsed from trigger actuation to firing pin impact in order to provide quantitative data on the performance of the firearm's trigger and firing mechanism.

2. Description of the Related Art

Various devices have been made for conducting force testing or force and deflection testing on instruments or objects, such as, for example on firearms. Simple force gauges are often small enough to be hand held, but combined force and trigger deflection measuring devices are often table models due to their large size. Use of these types of devices provides limited data on the performance of a firearm's trigger. However, because they do not monitor striking of the firing pin, they do not provide enough data to allow the user to obtain a profile on the combined operation of the trigger and the firing mechanism. Obtaining a trigger profile is important in fine tuning the firearm's trigger mechanism, particularly for improving speed and precision of the shooting. The present invention addresses this need by providing a small hand held or permanently mountable device for analyzing trigger function. The device of the present invention can measure a strike of the firearm's firing pin and correlate this data with data relating to movement or travel of the firearm's trigger and data relating to force on the trigger. The device can interface with a personal computer so that the data received by the device can be displayed in graphical format, showing force exerted on the trigger versus travel of the trigger. The device also mathematically analyzes the data to arrive at quantitative values for certain key performance parameters, including lock time and roughness of trigger action. Further, the present invention can be used as a hand held device, either attached or detached from a computer, for measuring both force, trigger travel or deflection, and lock time.

SUMMARY OF THE INVENTION

The present invention is trigger analyzer device for use in testing unloaded firearms, such as pistols or rifles. The device is provided with a control box on which are located a "GO" button, a "RETURN" button, a first LED indicated display and a second LED indicating display.

Power is supplied to the control box via a DC power cord. An AC adaptor is provided on the DC power cord and plugs into a standard 120 volt electrical outlet. Specifically, power from the DC power cord is supplied to a microprocessor with electronic circuitry located within the control box and to a strain gauge located external to the control box.

The control box contains therein the microprocessor, an audio device, the stepping motor driver, an A/D converter and an amplifier. The microprocessor is connected electrically to the audio device and controls its operation. The amplifier receives electrical signals from the strain gauge, amplifies those signals and transmits those amplified signals to the A/D converter to which the amplifier is electrically connected. The AND converter converts those amplified signals into digital signals and transmits those digital signals to the microprocessor to which the A/D converter is electrically connected.

The microprocessor is electrically connected to the "GO" and "RETURN" buttons which control the operation of the device. The microprocessor is also electrically connected to the first and second LED indicating displays so that the microprocessor controls their operation and provides data which is displayed thereon.

The microprocessor is electrically connected to the stepping motor driver. The microprocessor controls the operation of the stepping motor driver and uses and stores information on the signals it sends to the stepping motor driver to calculate the associated linear travel of a firearm's trigger.

The stepping motor driver provides power via a stepping motor cable to a stepping motor which is attached to the control box. A housing which attaches by one end to the stepping motor has contained therein a lead screw. The lead screw is turned by the stepping motor. The lead screw is movably provided with a travelling nut which moves along the lead screw when the lead screw rotates, thus translating the rotational movement of the lead screw into linear travel of the travelling nut.

A fixed or stationary jaw secures to the stepping motor and extends outward therefrom. A moving jaw attaches to the travelling nut and extends outward therefrom so that the moving jaw is approximately perpendicular to the lead screw and approximately parallel to the stationary or fixed jaw and located in a common plane with the fixed jaw. The moving jaw moves away from the fixed jaw whenever the "GO" button is pushed, and the moving jaw moves toward the fixed jaw whenever the "RETURN" button is pushed.

A non-scratching shoe is provided on a tapered distal end of the fixed jaw so that the firearm will not be damaged when the fixed jaw engages an inside front portion of a trigger guard of a firearm. Likewise a "V" shaped roller which is constructed of a non-scratching material is provided on a tapered distal end of the moving jaw so that the trigger of the firearm will not be damaged when the moving jaw engages the trigger within the "V" shaped roller. The "V" shaped roller is provided on the moving jaw so that it aligns with the longitudinal axis of the moving jaw.

The strain gauge is located within the moving jaw and translates force exerted on the trigger by the moving jaw into electrical signals which it transmits via the strain gauge cable to the amplifier, as previously described.

A firing pin sensor cable removably attaches by one end to the control box, and more specifically, electrically connects to the microprocessor. A second end of the firing pin sensor cable bifurcates into a firing pin sensor lead and an electrical contact lead. The electrical contact lead is electrically connected to an electrical contact, such as a clamp, which removably secures to an electrically conductive portion of the firearm, for example a barrel of the firearm, in order to supply a constant DC current to the firearm.

The firing pin sensor lead is electrically connected to a firing pin contact sensor which inserts through the muzzle of the firearm, through the barrel and is positioned within the shell chamber adjacent the firing pin. The firing pin contact sensor is provided with an electrically non-conductive external covering which prevents an electrical circuit from being completed through the firearm until the firing pin fires and strikes a spring loaded conductive portion located slightly recessed within the firing pin contact sensor.

The conductive portion is electrically connected via the firing pin sensor lead and the firing pin sensor cable to the microprocessor so that when the firing pin strikes the conductive portion, the microprocessor instantaneously receives an electrical signal.

Alternately, for use on firearms which have such small bores that the normal firing pin contact sensor cannot be inserted through the muzzle, an alternate firing pin sensor lead is provided instead of the normal firing pin sensor lead on the firing pin sensor cable. This alternate firing pin sensor lead removably attaches to an alternate firing pin contact sensor which is removed in order to allow the alternate firing pin sensor lead to be fed through the muzzle and the barrel to the shell chamber. The alternate firing pin contact sensor is then reattached to the alternate firing pin sensor lead so that the alternate firing pin contact sensor lies in the shell chamber adjacent to the firing pin. The alternate firing pin contact sensor has an alternate nonconductive external covering and an alternate conductive portion which are modified only to the extent necessary to allow the alternate firing pin contact sensor to removably engage the alternate firing pin sensor lead and allow it to removably insert into the firearm's shell chamber. The firing pin sensor cable, the electrical contact lead and the electrical contact are not altered in association with the alternate firing pin sensor lead and alternate firing pin contact sensor.

A computer may be removably attached to the control box so that the computer and the microprocessor share data communication with each other via a computer cable. The computer may also be connected to a printer via a printer cable so that data from testing by the device may be displayed on a screen of the computer or printed out as a hardcopy on the printer.

The device may be permanently or removably secured to a supporting structure via an adjustable mounting clamp. It is particularly useful to secure the device to a supporting structure when the firearm to be tested is a rifle. In that case, the rifle is made to lie on rests which secure to the supporting structure. The mounting clamp is then adjusted to allow the device to be properly positioned relative to the rifle, i.e. with the fixed and moving jaws of the device located between the trigger and a front portion of the trigger guard, but not touching the trigger.

A distal end of the housing is also provided with an adjustable bumper pad against which either a stock of a rifle or a handle or grip of a pistol may rest in order to help to stabilize the firearm during testing.

The device is operated by first moving the moving jaw toward the fixed jaw. This is done either by pushing the "RETURN" button or controlling the device's operations via the computer. The fixed and moving jaws are then positioned between the firearm's trigger and trigger guard so that when the moving jaw travels away from the fixed jaw, the trigger is engaged and depressed so that the firearm dry fires. The moving jaw is caused to travel away from the fixed jaw either by depressing the "GO" button or by controlling the device's operation via the computer.

As the trigger is depressed, the strain gauge provides continuous measurements to the microprocessor regarding force exerted on the trigger. These measurements are displayed on the first LED indicating display, are associated with the corresponding linear travel of the moving arm, and are transmitted to the computer where the data is displayed numerically and graphically.

Simultaneously, at the moment the firing pin strikes, this data is transferred to the microprocessor which calculates the lock time and displays this value on the second LED display. This data is also transmitted to the computer where all the data relating to the test of the firearm's trigger characteristics appears on the computer's screen. The computer further calculates and displays certain key parameters associated with the firearm's test such as initial takeup or initial touch, travel to fire, overtravel, peak or maximum force, energy to fire and relative roughness. This data, which is presented graphically and numerically, can be saved in a file for later retrieval, and may also be printed onto paper via the printer which is attached to the computer. Thereafter, the device may be reset for the next cycle of testing. The user resets the device by entering the appropriate command via the computer.

DETAILED DESCRIPTION OF THE PREFERRED EMBODIMENT

Figure 1:
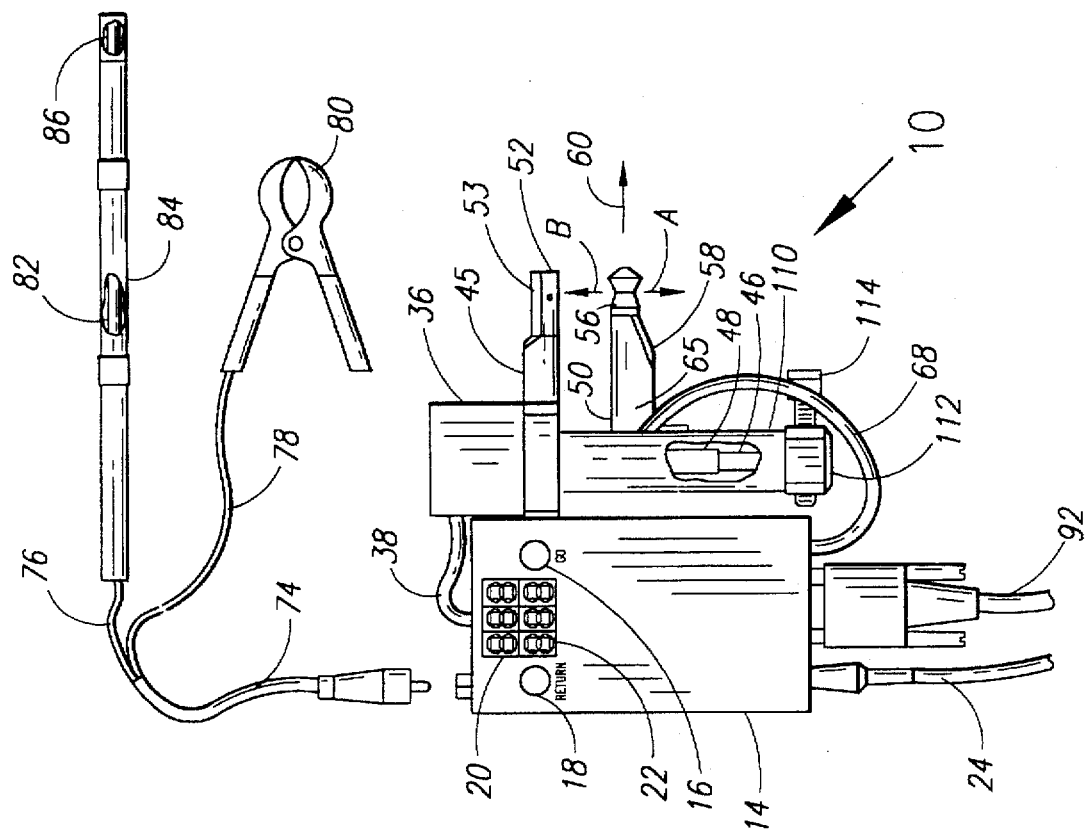
FIG. 1 is a front view of a trigger analyzer device constructed in accordance with a preferred embodiment of the present invention, shown with its firing pin sensor cable disconnected and not showing connection to a personal computer.
Figure 3:
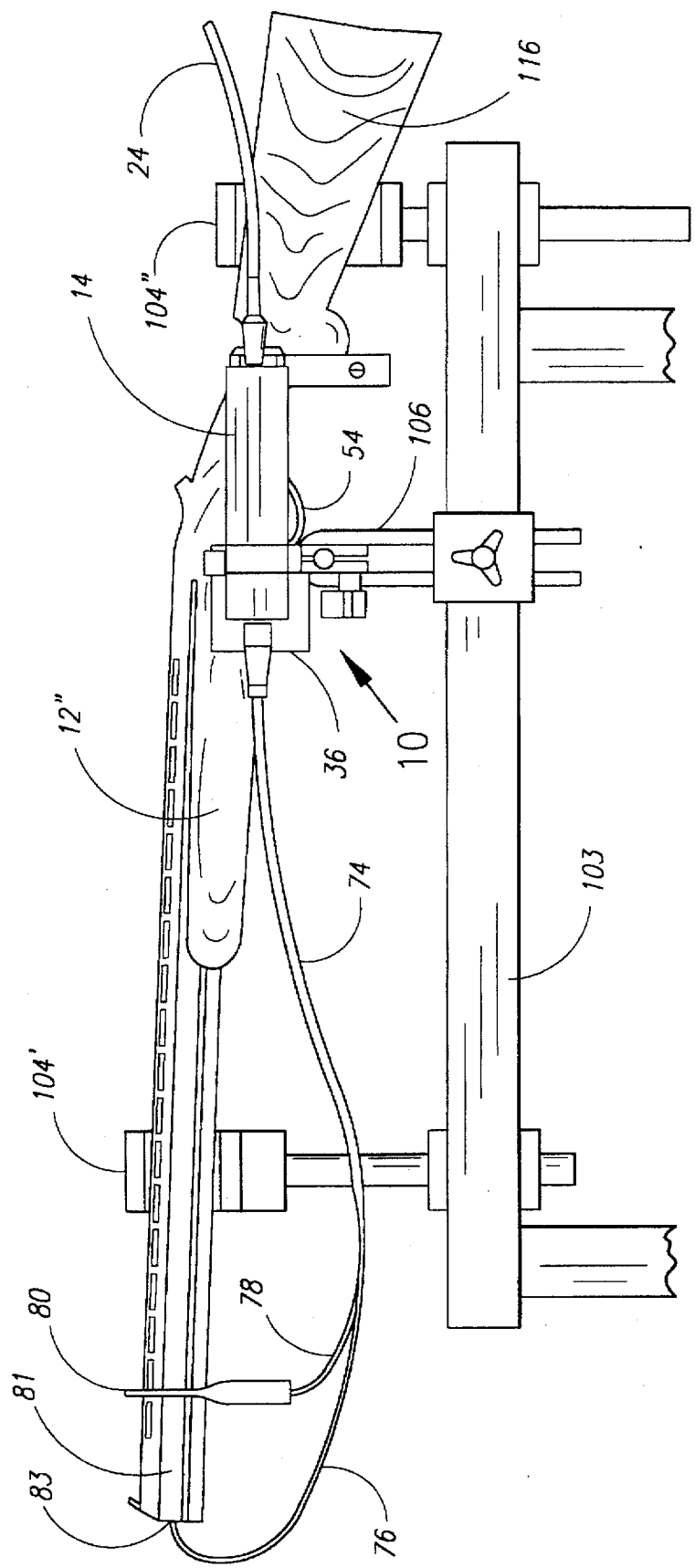
FIG. 3 is a side view of the device of FIG. 2, shown permanently mounted and shown in use on testing a rifle.
Figure 4:
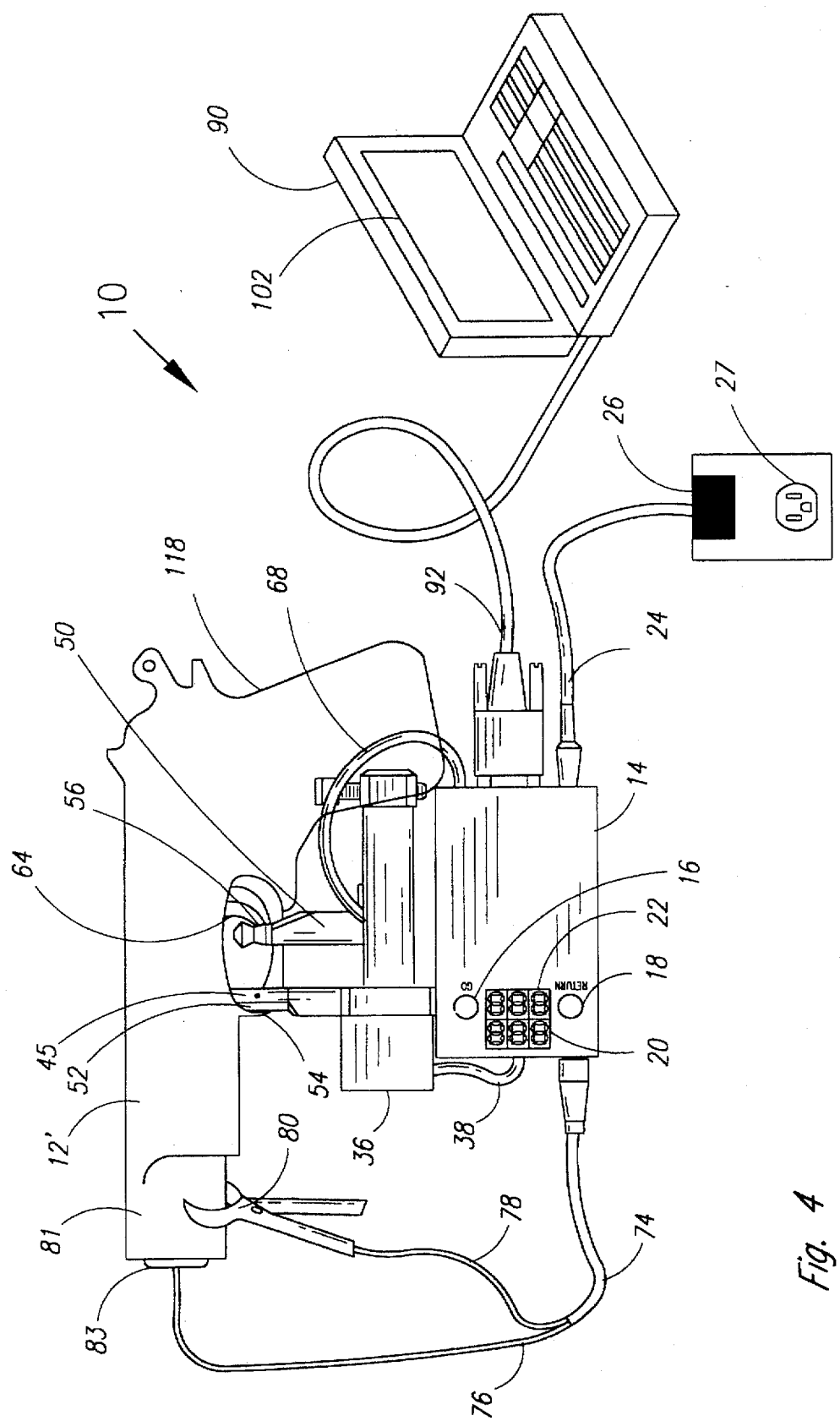
FIG. 4 is perspective view of a device shown attached to a personal computer and in use on testing a pistol.

Referring now to the drawings and initially to FIGS. 1, 3 and 4, there is illustrated a trigger analyzer device 10. The device 10 can be used to test a firearm, such as a pistol 12', as illustrated in FIG. 4, or a rifle 12", as illustrated in FIG. 3. Although the device 10 will hereinafter be described for use in testing firearms, the invention is not to be so limited. The device 10, either in the exact form described herein or with only minor modifications or attachments, is suited for use in testing a variety of other objects, such as for example coil springs, strings, fishing lines, sewing threads, rubber bands, jewelry chains or other similar objects which require tensile or compression testing.

The device 10 is provided with a control box 14 on which two control buttons 16 and 18 are located. The first control button is a "GO" button 16, and the second control button is a "RETURN" button 18. The control box 14 is also provided with a pair of LED indicating displays 20 and 22 for displaying respectively force exerted on a trigger 64 of a firearm being tested and lock time for the firearm.

The control box 14 receives DC power via a DC power cord 24 which removably attaches by one end to the control box 14 and which permanently attaches by another end to a AC adaptor 26. As illustrated in FIG. 4, the AC adaptor 26 plugs into a standard AC electrical outlet 27 from which the AC adaptor 26 receives electricity. This electrical connection between the AC power source, i.e. the electrical outlet 27, and the AC adaptor 26 is illustrated in FIG. 5 by line 29.

Figure 5:
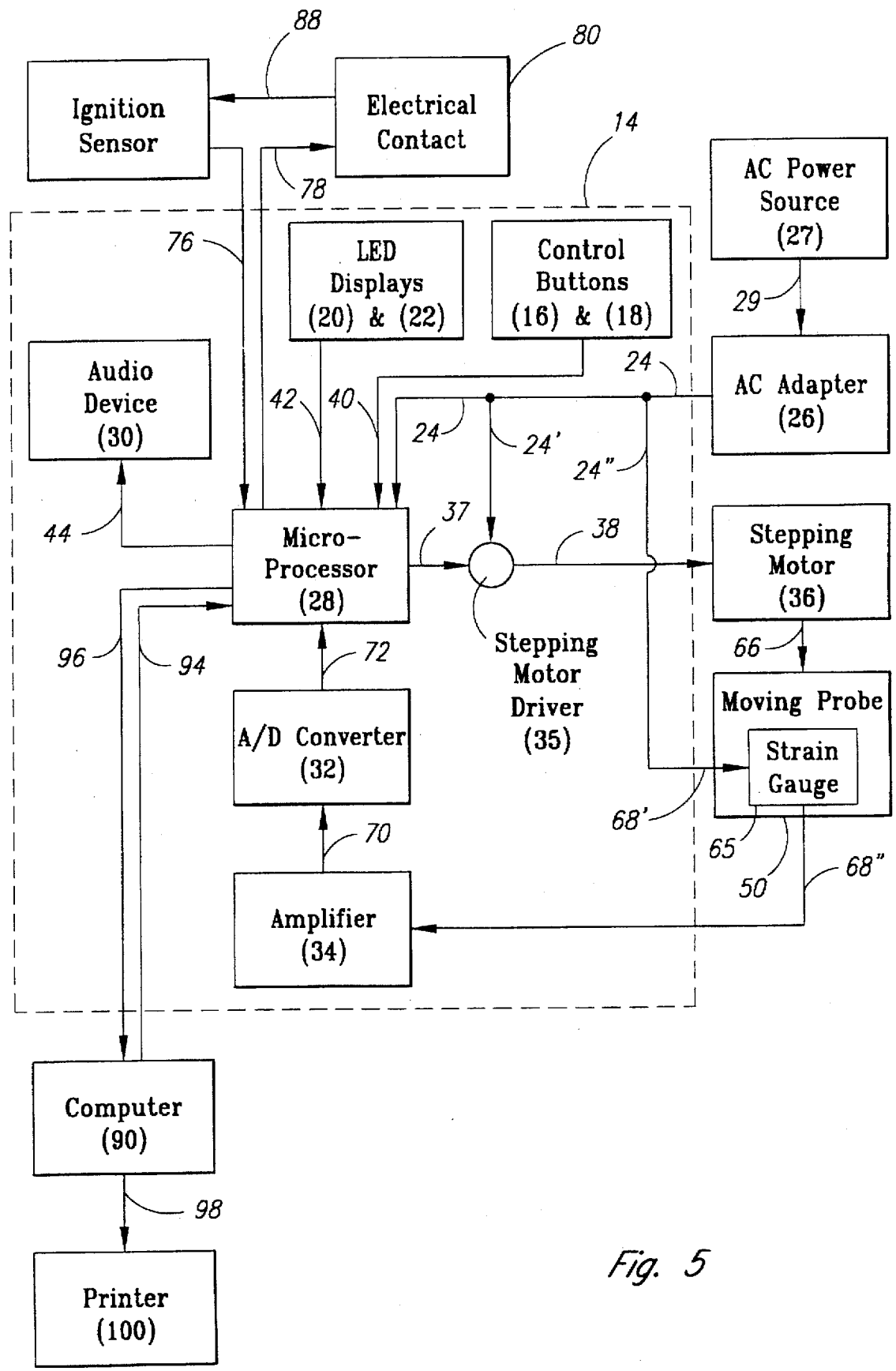
FIG. 5 is a diagram of the device illustrating the major components of the device, with those components located within the control box indicated by inclusion within the broken lines.

As illustrated in FIG. 5, in addition to the control buttons 16 and 18 and the LED displays 20 and 22 which secure to the control box 14, the control box 14 houses a microprocessor 28, an audio device 30, and A/D converter 32, and an amplifier 34. The microprocessor 28 attaches to and receives DC power from the AC adaptor 26 via the DC power cord 24. Once inside the control box 14, two additional power lines 24' and 24" spring off from the DC power cord 24. Power line 24' supplies electricity to stepping motor driver 35 which in turn supplies electricity via stepping motor cable 38 to a stepping motor 36 under directions received by the stepping motor driver 35 from the microprocessor 28 via an electricity control connection 37. Power line 24" which, upon exiting the control box 14, becomes an electricity supplying portion, also called excitation, 68' of a strain gauge cable 68 in order to supply electricity to a strain gauge 65. As the microprocessor 28 sends directions to the stepping motor driver 35, it also stores this information and converts it into a measure of linear travel for the moving jaw 50. The stepping motor 36 is attached to the control box 14.

The audio device 30 may be activated by the microprocessor 28 to audibly signal a variety of things. For example, the audio device 30 may be activated to indicate the device 10 is operative, to signal completion of a test or to warn of a problem during testing, or to signal firing pin strike detected by firing pin contact sensor 82.

As shown by line 40 in FIG. 5, the control buttons 16 and 18 are connected to and send electrical signals to the microprocessor 28 in order to control operation of the device 10, as will be more fully explain hereafter. Also, as shown by line 42 in FIG. 5, the LED displays 20 and 22 are connected to and receive electrical signals from the microprocessor 28 in order to display data on the LED displays 20 and 22. Likewise as shown by line 44 in FIG. 5, the audio device 30 is connected to an receives electrical signals from the microprocessor 28 in order to produce an audible alarm.

Referring now to FIG. 1, the stepping motor 36 is provided with a stationary or fixed jaw 45 extending outwardly therefrom. The stepping motor 36 turns a lead screw 46 on which a travelling nut 48 is movably provided. A moving jaw 50 is secured to the travelling nut 48 so that they move in unison. The moving jaw 50 extends outwardly from the lead screw 46 so that the fixed jaw 45 and the moving jaw 50 are approximately parallel and lie in a common plane.

Thus, when the stepping motor 36 is activated by pushing the "GO" button 16, this translates into linear movement of the moving jaw 50 in a direction away from the fixed jaw 45, as indicated by arrow "A" in FIG. 1. Similarly when the direction of the stepping motor 36 is reversed by the user pushing the "RETURN" button 18, the moving jaw 50 moves in the opposite direction so that it moves toward the fixed jaw 45, as indicated by arrow "B" in FIG. 1.

As illustrated in FIGS. 1 and 4, the fixed jaw is preferable tapered distally so that its distal end 52 is narrowed slightly in order to easily engage inside and forward on a trigger guard 54 of a firearm. The distal end 52 is preferably provided with a non-scratching shoe 53 for engaging the trigger guard 54 without scratching or marring it. The shoe 53 is preferable constructed of a plastic, such as for example polyurethane, in order that it be non-skid and also non-abrasive to the trigger guard 54. Likewise, the moving jaw 50 is modified distally by tapering and by the addition of a "V" shaped roller 56 at the distal end 58 of the moving jaw 50. The "V" shaped roller 56 is oriented axially along a longitudinal axis 60 of the moving jaw 50 in order to securely receive a trigger 64 of the firearm, as illustrated in FIG. 4.

The moving jaw 50 is provided internally with the strain gauge 65, as illustrated in FIG. 1, and also illustrated in FIG. 5 by a block-within-a-block arrangement of blocks 65 and 50. Also line 66, which is provided in FIG. 5 leading from the stepping motor 36 to the moving jaw 50 represents physical connection via the lead screw 46 and traveling nut 48 of the moving jaw 50 and its internally contained strain gauge 65 with the stepping motor 36.

The strain gauge 66 is electrically connected to the control box 14 via the strain gauge cable 68 and more specifically by the electrical supplying portion or excitation 68' thereof, which has previously been described. When the moving jaw 50 pushes against the trigger 64, strain on the moving jaw 50 is measured by the strain gauge 65, producing a variable electrical current. This electrical current travels via the strain gauge cable 68, and more specifically via a signal supplying portion 68" of the strain gauge cable 68, to the amplifier 34. In FIG. 5, the strain gauge cable 68 is represented by two lines, line 68' which represents electrical power supplied to the strain gauge 65, and line 68" which represents a variable electrical current or signal moving from the strain gauge 65 to the amplifier 34.

The variable electrical current which originated in the strain gauge 65 is amplified in the amplifier 34 and travels to the A/D converter 32 via electrical connection 70. The A/D converter 32 converts the amplified current into a digital signal which travels to the microprocessor 28 via connection 72.

An firing pin sensor cable 74 attaches to the control box 14 on one end of the cable 74 and the opposite end of the cable 74 bifurcates into an firing pin sensor lead 76 and an electrical contact lead 78. The electrical contact lead 78 supplies electricity from the microprocessor 28 to an electrical contact 80, such as the alligator clamp illustrated in the drawings, which attaches to an electrically conductive portion of the pistol 12' or rifle 12", such as, for example, the barrel 81 of the firearm. A constant supply of DC current is thus applied to the pistol 12' or rifle 12" via the electrical contact 80.

The firing pin sensor lead 76 electrically connects an firing pin contact sensor 82 to the microprocessor 28. The firing pin contact sensor 82 has a nonconductive external covering 84 surrounding a conductive recessed contact portion 86. The conductive portion 86 is spring loaded in order to receive the kinetic energy of the firing pin (not shown) without damaging the firing pin contact sensor 82 or the firing pin itself (not shown). As shown for the rifle 12" in FIG. 3, the firing pin contact sensor 82 is pushed through the barrel 81 via its muzzle 83 so that the firing pin contact sensor 82 lies in the shell chamber (not illustrated) adjacent the firing pin (also not illustrated). The conductive recessed contact portion 86 is electrically connected to the microprocessor 28 via the firing pin sensor lead 76 and firing pin sensor cable 74 so that when the firing pin (not illustrated) of the pistol 12' or rifle 12" is activated by depression of the trigger 64, the firing pin (not shown) strikes the conductive portion 86 of the firing pin contact sensor 82. When the firing pin (not shown) engages the firing pin contact sensor 82, an electrical circuit is completed through the pistol 12' or rifle 12". The electricity which is constantly being applied to a conductive part of the pistol 12' or rifle 12" via the electrical contact 80 travels through the pistol 12' or rifle 12" to the firing pin (not shown) and back to the microprocessor via the firing pin sensor lead 76 and firing pin sensor cable 74. The completion of the electrical circuit between the electrical contact 80 and the firing pin contact sensor 82 via either the pistol 12' or the rifle 12" is shown in FIG. 5 by line 88.

Figure 8:
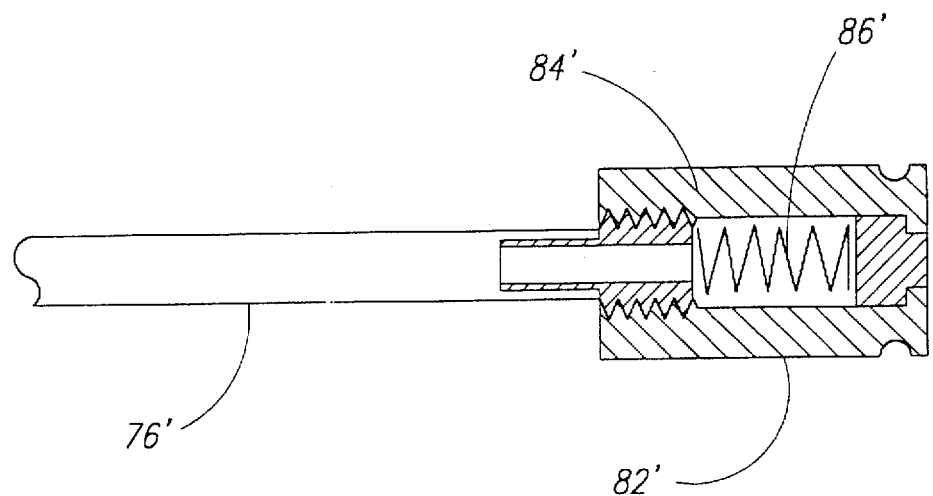
FIG. 8 is an alternate embodiment of the firing pin contact sensor for use with firearms which have a barrel with a small bore.

An alternate embodiment firing pin contact sensor 82' is illustrated in FIG. 8. This alternate sensor 82' replaces sensor 82 for firearms which have a barrel with an internal bore too small to allow the sensor 82 to travel therethrough in order to reach the shell chamber (not shown) and be located adjacent the firing pin (not shown).

The alternate embodiment firing pin contact sensor 82' is replacably disconnectable from an alternate firing pin sensor lead 76' so that the alternate sensor 82' can be removed from the alternate jaw lead 76' in order to allow the alternate jaw lead 76' to be fed through the firearm's barrel 81 via the muzzle 83 until the end of the alternate jaw lead 76' enters the shell chamber (not shown). The alternate sensor 82' is then placed in the shell chamber (not shown) and reattached to the alternate jaw lead 76'. Only the alternate jaw lead 76' and the alternate sensor 82' are altered from the previously described lead 76 and sensor 82; the firing pin sensor cable 74, the electrical contact lead 78 and the electrical contact 80 remain unaltered in this alternate embodiment. An alternate nonconductive external covering 84' and an alternate conductive portion 86' are altered only to the extend necessary to allow the alternate sensor 82' to fit into the shell chamber (not shown). The alternate conductive portion 86' is spring loaded in a manner similar to conductive portion 86 in order that the alternate firing pin contact sensor 82' will not be damaged when struck by the firing pin (not shown).

The microprocessor 28 connects interactively with a computer 90 via a standard computer cable 92. The computer 90 is preferable a personal computer equipped with the appropriate software. The software preferably runs in a Windows® operating environment, but is, or can be made so that it will be, compatible with other operating systems.

The microprocessor 28 can receive data by communicating with the computer 90, as shown by line 94 in FIG. 5. The microprocessor 28 also sends data relating to trigger performance to the computer 90, as shown by line 96 in FIG. 5. Also, as illustrated in FIG. 5, the computer 90 may optionally be connected via a printer cable 98 to a printer 100 for printing out hard copies of the information appearing on the screen 102 of the computer 90.

Figure 2:
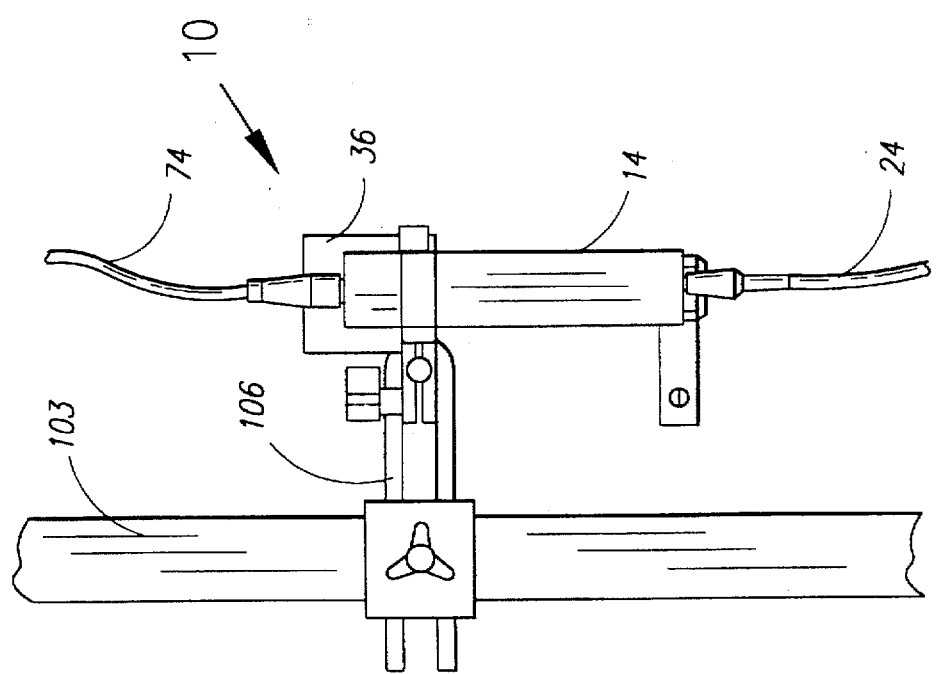
FIG. 2 is a side view of the device of FIG. 1 illustrating use of an optional adjustable mounting clamp for permanently mounting the device.

When testing a pistol 12', as shown in FIG. 4, the device 10 and the pistol 12' can be held in the user's hands. However, in testing a rifle 12", as shown in FIG. 3, it may be more convenient to mount the rifle 12" to a supporting structure 103 via rests 104' and 104" and to adjustable secure the device 10 to the supporting structure 103 via an adjustable mounting clamp 106, as shown in FIGS. 2 and 3, or via other suitable securing means.

Referring now to FIGS. 1, 3 and 4, the device 10 is provided with a housing 110 which attaches by one end to the stepping motor 36 and surrounds the lead screw 46. An opposite distal end 112 of the housing 110 is provided with an adjustable bumper pad 114 against which rests either a stock 116 of the rifle 12" or a handle or grip 118 of the pistol 12' in order to help stabilize the firearm during testing. The bumper pad 114 is preferably constructed of a non-scratching and non-skid material, such as for example rubber, plastic or a similar material.

FUNCTION

The device 10 may be operated in two modes: either with or without being attached to the computer 90. If operated without attachment to the computer 90, only the LED displays 20 and 22 are available to show results of the test; i.e. showing pull force and lock time. The firing pin sensor 82 must be attached to the control box 14 in order to determine lock time. If operated with attachment to the computer 90 which is equipped with the appropriate software, the user is able to display the data, analyze it, print out reports and store in memory all results of tests.

The device 10 is first positioned adjacent the firearm to be tested so that the fixed jaw 45 and the moving jaw 50 are located between the forward trigger guard 54 and the trigger 64, the firing pin contact sensor 82 or alternate firing pin contact sensor 82' is positioned adjacent the firing pin (not shown), and the electrical contact 80 is properly secured to the firearm. In order to thus position the jaws 45 and 50 relative the firearm, it may be necessary to move the moving jaw 50 toward the fixed jaw 45 by depressing the "RETURN" button 18. Once the device 10 is properly positioned, the "GO" button 16 is then depressed and held in a depressed position until the test is completed. Depressing the "GO" button 16 activates the stepping motor 36 which constantly sends data to the microprocessor 28 regarding the movement of the motor 36. This data is constantly displayed on one of the LED displays, either 20 or 22, and is transmitted to the computer 90 which converts the data regarding movement of the motor 36 into the associated equivalent linear distance of travel of the moving jaw 50. Activation of the stepping motor 36 causes the moving jaw 50 to move away from the fixed jaw 45, causing the moving jaw 50 to engage the trigger 64 and continue moving or depressing the trigger 64 rearwardly until the firearm is dry fired and the trigger 64 will no longer move rearward.

Figure 6:
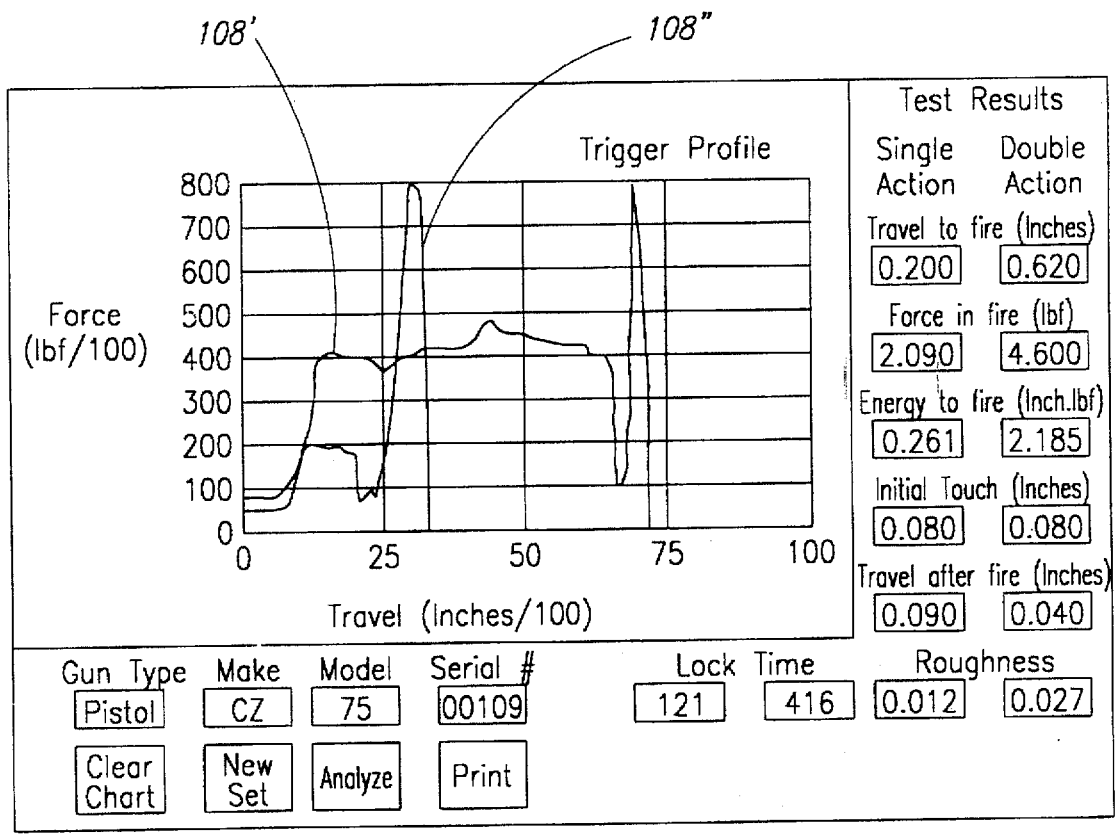
FIG. 6 is an enlarged view of the screen on the personal computer shown in FIG. 4.

Simultaneously with the movement of the moving jaw, the strain gauge 65 measures force on the trigger 64 and transfers this data via the strain gauge cable 68, the amplifier 34, and the A/D converter 32 to the microprocessor 28 which constantly displays this data on one of the LED displays, either 22 or 20, and transmits the data via the computer cable 92 to the computer 90. The computer 90 displays the data and plots it on a computer screen 102 as a graph with the associated measurements of linear travel of the trigger 64, as shown in FIG. 6. At the far left hand side of FIG. 7, the force versus travel curve 108 is shown with a force of "0". The force will remain at "0" until the moving jaw 50 engages the trigger 64.

Figure 9:
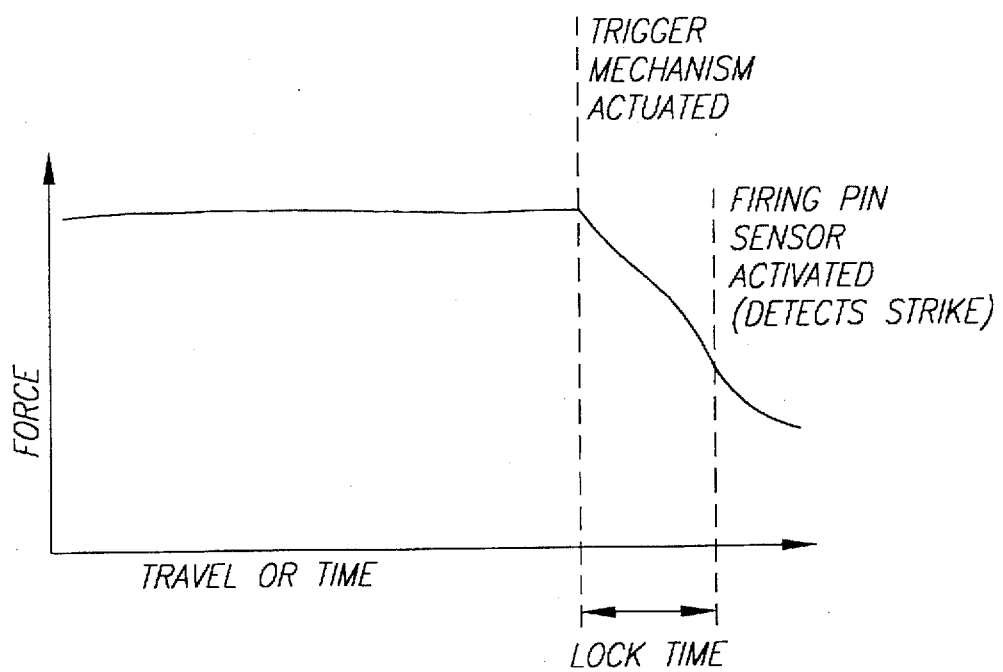
FIG. 9 is a enlarged view of the portion of FIG. 7 contained within the broken lines.

When the trigger 64 is activated, the firearm's firing pin (not shown) is released and it strikes either the firing pin contact sensor 82 or the alternate sensor 82', thus completing the electrical circuit. The microprocessor 28 records the time of the activation of the trigger 64, as sensed by the microprocessor 28 as a rapid drop in force on the trigger 64, and records the time of the impact or strike of the firing pin (not shown). This is illustrated in FIG. 9. The time interval between activation of the trigger 64 and impact of the firing pin (not shown) is calculated by the microprocessor 28 in units of milliseconds and displayed on the second LED indicating display 22. This data is also transferred to the computer 90 where it is displayed on the computer screen 102 as the lock time.

Once the trigger 64 has been fully depressed, the microprocessor 28 begins receiving data from the strain gauge 65 showing rapidly increasing force which quickly rises to infinity. When this happens, the microprocessor 28 stops the stepping motor 36. The operator may then manually reverse the stepping motor 36 by either pushing the "RETURN" button 18 in order to release the firearm from the device 10 or by controlling this Return function via the computer 90. The computer 90 can activate the moving jaw instead of using the "GO" and "RETURN" buttons 16 and 18 and can zero the displays 20 and 22. Also, the operator may reset the device 10 by activating a "new set" button on the computer screen 102.

At the end of the test, the data for the test is displayed graphically and numerically on the computer screen 102, as illustrated in FIG. 6. FIG. 6 shows data and force versus travel curves 108' and 108" resulting from data obtained from two tests of a single firearm operated first in a single action mode and then operated in a double action mode. Single action refers to firing of a cocked firearm, whereas, double action refers to firing of an uncocked firearm, i.e. where the trigger 64 cocks a hammer (not shown) of the firearm before firing the firearm. As FIG. 6 illustrates, the computer 90 is capable of displaying multiple profiles simultaneously. Also, the computer 90 stores the profiles, along with information on the firearm in nonvolatile memory so that it can be retrieved at a later time.

Figure 7:
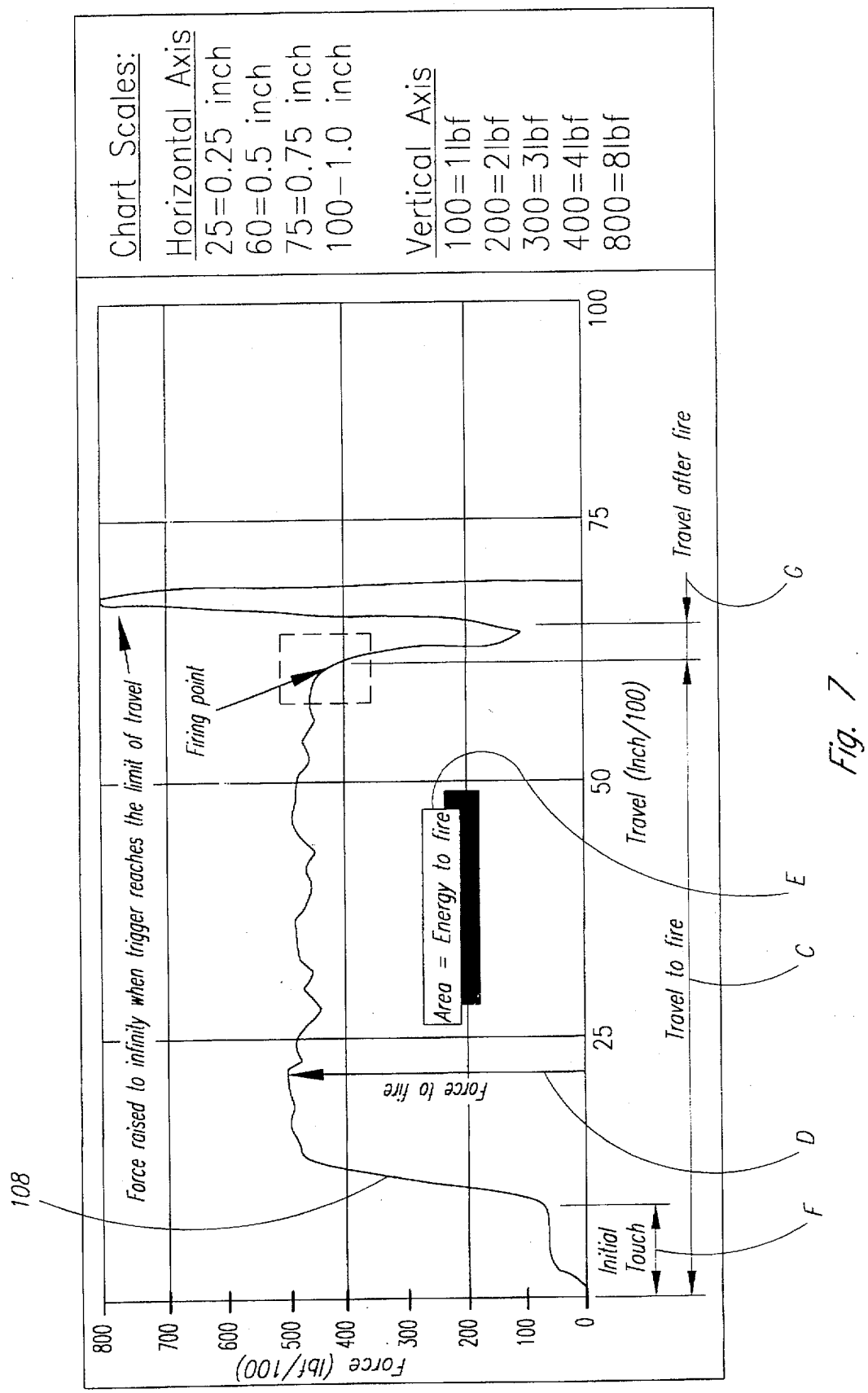
FIG. 7 is a chart illustrating interpretation of the graph and test results displayed on the screen of FIG. 6.

FIG. 6 can be best understood by referring to FIG. 7 which is a sample graph illustrating the key results displayed at the right side of the screen 102 in FIG. 6. Briefly the travel to fire measurement is the distance in inches the trigger 64 moves linearly from the time of initial contact of the trigger 64 until the trigger 64 fires, as illustrated by Arrow "C" in FIG. 7. The force to fire measurement is the maximum instantaneous force measured in pounds required to move the trigger 64 to its firing point, as illustrated by Arrow "D" in FIG. 7. The energy to fire, expressed in inch pounds, is the total energy exerted on the trigger 64 in order to cause it to fire and is mathematically equivalent to the area under the force versus travel curve 108 of the trigger's profile, as explained in Block "E" in FIG. 7. The initial touch or initial takeup, expressed in inches, is the distance the trigger 64 moves linearly before a substantial increase in force is encountered, as illustrated by Arrow "F". The initial touch or initial takeup could also be thought of in terms of excess initial play in the trigger 64. The travel after fire or overtravel, expressed in inches, is the linear distance the trigger 64 moves after it fires and before it reaches its rearward limit of travel, as illustrated by Arrow "G" in FIG. 7. Roughness is a calculated indicator of the smoothness or jerkiness of the trigger action and is calculated from the force versus travel curve 108 of the trigger profile. Roughness is calculated using a statistical function, such as moving range, or a peak-to-peak value of the force curve over a certain distance of travel.

While the invention has been described with a certain degree of particularity, it is manifest that many changes may be made in the details of construction and the arrangement of components without departing from the spirit and scope of this disclosure. It is understood that the invention is not limited to the embodiments set forth therein for the purposes of exemplification, but is to be limited only by the scope of the attached claim or claims, including the full range of equivalency to which each element thereof is entitled.

What is claimed is:

1. A trigger analyzer comprising:

a microprocessor electrically connected to a stepping motor for controlling operation of said stepping motor, a stationary jaw secured to and extending outward from said stepping motor, said stationary jaw removably engaging a trigger guard of a firearm, a moving jaw movably connected to said stepping motor so that said stepping motor causes said moving jaw to travel linearly and so said stationary jaw and said moving jaw are approximately parallel and lie in a common plane, said moving jaw removably engaging a trigger of the firearm, and a strain gauge provided on said moving jaw for measuring force on said trigger, said strain gauge electrically connected to said microprocessor in order that force measurements are transferred to the microprocessor where the force measurements are continually displayed on a first indicating display which is electrically connected to said microprocessor.

2. A trigger analyzer according to claim 1 further comprising:

a computer electrically attached to said microprocessor so that data communication occurs therebetween.

3. A trigger analyzer according to claim 2 wherein said computer is provided with an appropriate computer program for analyzing and storing data received from said microprocessor and for displaying said data graphically and numerically on a computer screen of said computer.

4. A trigger analyzer according to claim 3 further comprising:

said computer being electrically connected to a printer so that said data may be printed out as a hardcopy.

5. A trigger analyzer comprising:

a microprocessor electrically connected to a stepping motor for controlling operation of said stepping motor, a stationary jaw secured to and extending outward from said stepping motor, a moving jaw movably connected to said stepping motor so that said stepping motor causes said moving jaw to travel linearly and so said stationary jaw and said moving jaw are approximately parallel and lie in a common plane, a strain gauge provided on said moving jaw for measuring force on said moving jaw, said strain gauge electrically connected to said microprocessor in order that force measurements are transferred to the microprocessor where the force measurements are continually displayed on a first indicating display which is electrically connected to said microprocessor, a means for detecting a strike of a firing pin of a firearm, said means for detecting a strike being electrically connected to said microprocessor in order to provide data to said microprocessor regarding the moment the firing pin strikes.

6. A trigger analyzer according to claim 5 wherein said means for detecting a strike further comprises:

an electrical contact being electrically connected to said microprocessor and also to an electrically conductive portion of said firearm so that said firearm constantly receives a DC current from said microprocessor, and a firing pin contact sensor electrically connected to said microprocessor and positioned adjacent said firing pin so that an electrical circuit is completed through said firearm when said firing pin strikes said firing pin contact sensor.

7. A trigger analyzer according to claim 6 wherein said firing pin contact sensor further comprises:

a spring loaded conductive portion electrically connected to said microprocessor, and an electrically non-conductive external covering surrounding said conductive portion so that said conductive portion is slightly recessed within said covering but can be contacted by the firing pin when it strikes.

8. A trigger analyzer according to claim 7 wherein said conductive portion removably attaches electrically to said microprocessor.

9. A trigger analyzer according to claim 8 wherein said microprocessor calculates lock time from data received from said firing pin contact sensor and from said strain gauge and displays said lock time on a second indicating display which is electrically connected to said microprocessor.

10. A trigger analyzer comprising:

a microprocessor electrically connected to a stepping motor for controlling operation of said stepping motor, a stationary jaw secured to and extending outward from said stepping motor, a moving jaw movably connected to said stepping motor so that said stepping motor causes said moving jaw to travel linearly and so said stationary jaw and said moving jaw are approximately parallel and lie in a common plane, a strain gauge provided on said moving jaw for measuring force on said moving jaw, said strain gauge electrically connected to said microprocessor in order that force measurements are transferred to the microprocessor where the force measurements are continually displayed on a first indicating display which is electrically connected to said microprocessor, a computer electrically attached to said microprocessor so that data communication occurs therebetween, and a means for detecting a strike of a firing pin of a firearm, said means for detecting a strike being electrically connected to said microprocessor in order to provide data to said microprocessor regarding the moment the firing pin strikes.

11. A trigger analyzer according to claim 10 wherein said computer is provided with a computer program for analyzing and storing data received from said microprocessor and for displaying said data graphically and numerically on a computer screen of said computer.

12. A trigger analyzer according to claim 11 wherein said means for detecting a strike further comprises:

an electrical contact being electrically connected to said microprocessor and also to an electrically conductive portion of said firearm so that said firearm constantly receives a DC current from said microprocessor, and a firing pin contact sensor electrically connected to said microprocessor and positioned adjacent said firing pin so that an electrical circuit is completed through said firearm when said firing pin strikes said firing pin contact sensor.

13. A trigger analyzer according to claim 12 wherein said firing pin contact sensor further comprises:

a spring loaded conductive portion electrically connected to said microprocessor, and an electrically non-conductive external covering surrounding said conductive portion so that said conductive portion is slightly recessed within said covering but can be contacted by the firing pin when it strikes.

* * * * *